United States Patent
Graffouliere et al.

(10) Patent No.: US 10,637,536 B2
(45) Date of Patent: Apr. 28, 2020

(54) METHOD AND DEVICE FOR SYNCHRONIZING SIGNALS WITHIN A CONTACTLESS DEVICE

(71) Applicant: STMicroelectronics (Grenoble 2) SAS, Grenoble (FR)

(72) Inventors: Philippe Graffouliere, Voreppe (FR); Bruno Paille, Engins (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 16/239,666

(22) Filed: Jan. 4, 2019

(65) Prior Publication Data

US 2019/0222263 A1 Jul. 18, 2019

(30) Foreign Application Priority Data

Jan. 15, 2018 (FR) ...................... 18 50293

(51) Int. Cl.
*H04B 5/00* (2006.01)
*H04W 4/80* (2018.01)
*H04L 7/02* (2006.01)
*H04L 27/148* (2006.01)

(52) U.S. Cl.
CPC ............. *H04B 5/0031* (2013.01); *H04L 7/02* (2013.01); *H04L 27/148* (2013.01); *H04W 4/80* (2018.02)

(58) Field of Classification Search
CPC .......... H04B 5/0031; H04W 4/80; H04L 7/02; H04L 27/148

USPC ................................................ 455/41.1–41.3
See application file for complete search history.

(56) References Cited

U.S. PATENT DOCUMENTS

| | | | |
|---|---|---|---|
| 2004/0071207 A1* | 4/2004 | Skidmore ............ | H03H 21/003 375/233 |
| 2013/0288599 A1* | 10/2013 | Bernard ............. | G06K 19/0723 455/41.1 |
| 2016/0142113 A1* | 5/2016 | Gaethke ............... | H04B 5/0093 455/41.1 |
| 2016/0241384 A1* | 8/2016 | Frantzeskakis ...... | H04B 5/0031 |

FOREIGN PATENT DOCUMENTS

EP 2843840 A1 3/2015

* cited by examiner

*Primary Examiner* — Edward F Urban
*Assistant Examiner* — Angelica M Perez
(74) *Attorney, Agent, or Firm* — Slater Matsil, LLP

(57) ABSTRACT

A contactless communication device is capable of communicating in a contactless way with a reader by using active load modulation. Each frame is preceded by a reception period. An antenna is configured to receive a reader signal during each reception period, and to receive a reader carrier signal and transmit a modulated device carrier signal to the reader during each frame. A processor is configured to carry out, in each reception period, a first synchronization between a signal originating from the reader signal received at the antenna and a device carrier clock signal device generated in the device. The processor is also configured to carry out, within each frame, a modulated device carrier signal suppression process in order to obtain a processed signal, and a second synchronization between the processed signal and the device carrier clock signal.

25 Claims, 4 Drawing Sheets

METHOD AND DEVICE FOR SYNCHRONIZING SIGNALS WITHIN A CONTACTLESS DEVICE

CROSS-REFERENCE TO RELATED APPLICATIONS

This application claims priority to French Patent Application No. 1850293, filed on Jan. 15, 2018, which application is hereby incorporated herein by reference.

TECHNICAL FIELD

Applications and embodiments of the invention relate to a method and device for synchronizing signals within a contactless device.

BACKGROUND

The acronym NFC denotes a short-distance high-frequency wireless communication technology for exchanging data between two contactless devices over a short distance, of 10 cm for example.

NFC technology is standardized in the ISO/IEC 18092, ISO/IEC 21481 and NFC Forum documents, but incorporates a range of pre-existing standards including the type A and type B protocols of the ISO/IEC 14443 standard.

An NFC device may be generally used in either reader or card mode to interact with another contactless device, for example by using a contactless communications protocol such as protocol A of the ISO/IEC 14443 standard.

In card mode, the NFC component acts as a transponder, for example a card or a label, and interacts with the external device which is a reader.

There are numerous applications, such as passing through payment barriers in transport systems (the mobile telephone acting as a travel ticket) or payment applications (the mobile telephone acting as a credit card).

The device emulated in card mode may be passive or active. A passive device carries out load modulation on the magnetic field generated by the reader. An active device uses active load modulation (also known by those skilled in the art under the acronym of ALM) to transmit information to the reader. Furthermore, the device also generates a magnetic field via its antenna which simulates the load modulation of the reader field carried out by a passive device.

Active load modulation is advantageously used when the signal resulting from passive load modulation is not strong enough to be detected by the reader. This is the case, notably, when the antenna of the device is small or located in an unfavorable environment.

When a card is detected by the reader, in a known conventional manner, the reader initiates communication by modulating the magnetic field that it generates. This is a reception phase for the card. When the reader has terminated this step, the card responds by generating its own magnetic field and modulating it during transmission frames. There are then two possible situations.

In a first situation, each frame may comprise a series of bursts (as they are known in English) of ALM carriers, separated by spaces in which the card emits no information and no electromagnetic field. The time interval between the initial instants of two consecutive bursts is equal to the period of a subcarrier used for the modulation.

In some cases, the modulation must be increased. This is done by generating, in an uninterrupted way, the electromagnetic field produced by the card during the frames. This is the second situation.

In this second situation, depending on the information transmitted, the electromagnetic field generated by the card during the frame may have the same phase or a phase opposed to that of the magnetic field generated by the reader.

Consequently, the amplitude of the generated magnetic field decreases in inverse proportion to the cube of the distance.

Thus, at the card antenna, the electromagnetic field emitted by the card is at a higher level than that which has been received by the card (generated by the reader) and on which synchronization must take place. For guidance, the ratio between the level of the electromagnetic field emitted by the card and that received by the card (generated by the reader) may be as much as 60 dB.

In the first situation (bursts separated by spaces during each transmission frame), synchronization may take place within these spaces between the carrier signal generated by the reader and the ALM carrier clock signal generated by the card.

However, this is currently impossible in the second situation mentioned above, owing to the card's continuous generation of its own electromagnetic field during each transmission frame.

In this case, therefore, synchronization currently takes place during the reception phase preceding each transmission frame. This synchronization therefore takes place outside the frames. However, this solution is unsatisfactory.

In fact, the phase difference between the reader carrier signal and the ALM clock signal increases during each frame and is proportional to the length of the frame.

Moreover, this synchronization outside the frame requires an external clock reference, which increases the power consumption.

SUMMARY

Applications and embodiments of the invention relate to wireless or contactless communication using contactless devices or electronic components connected to an antenna, notably devices configured to exchange information with a reader via the antenna according to a contactless communication protocol.

Particular applications and embodiments of the invention relate to contactless communication between a contactless device and a reader at a frequency of 13.56 MHz, using active load modulation (ALM) for communication with the reader, and relate to synchronization between a reader carrier signal and a carrier clock signal generated in the device (ALM carrier clock signal).

These contactless components or devices may be, for example, components or devices known as "NFC" devices, that is to say devices compatible with NFC (Near Field Communication) technology.

The NFC device may be, for example, an integrated circuit or chip incorporating an NFC microcontroller. By way of non-limiting example, the NFC device may be, for example, incorporated into a cellular mobile telephone or tablet or any other communication apparatus, so that the latter may then be used for exchanging information with the contactless reader, in addition to its conventional communication function.

Embodiments of the invention provide a solution for improving the synchronization between the reader carrier signal and the device carrier clock signal (ALM carrier clock signal) when the device continuously generates its own electromagnetic field during each transmission frame. To meet this need, a device and method can eliminate, as far as possible, the electromagnetic field generated by the device from the signal received by the antenna of the device.

According to one aspect, a method is thus proposed for contactless communication from a device, for example, a cellular mobile telephone or a communication apparatus emulated in card mode, to a reader, the communication using active load modulation.

The method comprises transmission of frames from the device to the reader, each frame being preceded by a reception period during which a reader signal is received at the antenna of the device.

The method according to this aspect then further comprises, in each reception period, a first synchronization between a signal obtained from the received reader signal and a device carrier clock signal device (the ALM carrier signal) generated in the device.

The method further comprises, within each frame, reception of a reader carrier signal at the antenna of the device, and transmission of a modulated device carrier signal to the reader via the antenna; a modulated device carrier signal suppression process, carried out on an intermediate signal originating from the signal delivered by the antenna, in order to obtain a processed signal; and a second synchronization between the processed signal and the device carrier clock signal.

Thus, according to this aspect, the synchronization is started before the device transmission frame, that is to say during the reception period during which the reader carrier signal is received, after which this synchronization is continued during the device transmission frame by carrying out a process to suppress the modulated device carrier signal (that is to say, the signal transmitted by the card but present in the reception chain of the latter) so as to carry out this second synchronization between a signal from which as much as possible of the transmitted signal has been eliminated and the device carrier clock signal (ALM carrier signal) generated in the device.

The intermediate signal is, in practice, a digital signal, typically originating from an analog to digital conversion of an analog signal obtained from the signal received at the antenna, from a frequency transposition to return the signal to the baseband signal, and from decimation, if necessary.

The suppression process is then advantageously a digital process.

There are various possible ways of implementing the suppression process.

In a first variant, the suppression process may use an auxiliary signal containing the modulation symbols of the modulated device carrier signal.

In fact, these modulation symbols are known, because they are generated by the device itself. The suppression process then uses a noise suppression algorithm, the noise being formed by the auxiliary signal in this case.

The suppression process may, for example, comprise an adaptive filtering process comprising, for example, estimation of the filter coefficients by a least squares method.

The filter is advantageously a filter of the finite impulse response type.

In order to accelerate the convergence of the adaptive filtering process, it is preferable to initialize the filter coefficients before the start of each frame, for example at the end of the reception period preceding each frame.

The aforementioned noise suppression algorithm, using the auxiliary signal, may not be effective in all situations.

More precisely, such a noise suppression algorithm is more suitable, in particular, for high speeds and protocols resulting in low signal noise.

On the other hand, notably for low-speed protocols, such as the aforementioned type A protocol with a speed of 106 kilobits/second, and having very large direct content (DC) resulting in high noise, it is preferable to use an autosuppression algorithm for the transmission signal.

Thus, more precisely, when the device carrier signal is modulated by a periodic modulation signal, for example at a period equal to 16 times the carrier period (carrier at 13.56 MHz), the suppression process comprises summation of part of the intermediate signal with the part of the intermediate signal delayed by a delay which is equal, according to the sequence of the modulation signal symbols, to a half period or whole period of the modulation signal.

This autosuppression algorithm operates directly on the antenna signal. However, it requires a knowledge of the modulation signal in order to select the parts of the signal to be delayed, typically the periods in which the phase of the modulation signal does not change.

Evidently, it is entirely possible to combine the noise suppression process with the autosuppression process, that is to say to carry out the noise suppression process for some parts of the signal and the autosuppression process for other parts of the signal, or to combine these two processes (suppression and autosuppression).

According to one embodiment, the intermediate signal originates from an analog to digital conversion of an analog signal originating from that delivered by the antenna, and the device carrier clock signal (ALM carrier signal) is generated from an output signal of a digitally controlled oscillator ("DCO") belonging to a phase lock loop receiving the analog signal and incorporating a processing module implementing the suppression process. The analog to digital conversion is then performed at the rate of an auxiliary clock signal originating from the output signal of the digitally controlled oscillator.

The first synchronization, that is to say the synchronization that takes place before each transmission frame during the reception period, advantageously uses the phase lock loop, but with the suppression process disabled.

According to one embodiment, the oscillator is controlled by a control signal obtained solely from the output signal of a loop filter of the phase lock loop. In other words, the oscillator is controlled directly by the output signal of the loop filter, without the use of an external clock signal.

In a variant, it is also possible to use an external clock signal in an optional way, in which case the oscillator is controlled by a control signal obtained from the external clock signal and from the output signal of the loop filter of the phase lock loop.

According to another aspect, a contactless communication device is proposed, for communicating in a contactless way with a reader by using active load modulation and frames sent to the reader, each frame being preceded by a reception period. The device comprises an antenna configured for receiving a reader signal during each reception period, and for receiving a reader carrier signal and transmitting a modulated device carrier signal to the reader during each frame. A processor is configured for carrying out, in each reception period, a first synchronization between a signal originating from the reader signal received on the antenna and a device carrier clock signal device generated in the device, and carrying out, within each frame. The processor is also configured for carryout out a modulated device carrier signal suppression process, carried out on an intermediate signal originating from the signal delivered by the antenna, in order to obtain a processed signal, and a second synchronization between the processed signal and the device carrier clock signal.

According to one embodiment, the intermediate signal is a digital signal, and the processor comprises a processing module configured to carry out the suppression process in a digital manner.

According to one embodiment, the module comprises an input for receiving an auxiliary signal containing the modulation symbols of the modulated device carrier signal.

According to one embodiment, the processing module comprises an adaptive filter configured to estimate the filter coefficients according to a least squares method.

The processor preferably comprises a controller configured to initialize the coefficients of the filter before the start of each frame.

According to one embodiment, the device carrier signal is modulated by a periodic modulation signal, and the processing module comprises a summer configured to carry out a summation of at least a part of the intermediate signal with the part of the intermediate signal delayed by a delay having a value equal, according to the sequence of the modulation signal symbols, to a half period or a whole period of the modulation signal.

According to one embodiment, the processor comprises a phase lock loop comprising an analog to digital converter having an input connected to the antenna and capable of delivering the intermediate signal, the processing module, and a digitally controlled oscillator having an output capable of delivering an oscillator signal. The processor also includes a first clock signal generator configured to receive the oscillator signal and to generate an auxiliary clock signal for timing the analog to digital converter and a second clock signal generator configured to generate the device carrier clock signal from the oscillator signal.

According to one embodiment, the processor comprises a first synchronization circuit configured to carry out the first synchronization. The first synchronization circuit comprises the phase lock loop and a controller configured for disabling the processing module.

According to one embodiment, the phase lock loop comprises a loop filter configured to deliver a filter output signal for controlling the digitally controlled oscillator.

According to another possible embodiment, the phase lock loop comprises a loop filter and the processor comprises an external clock input for receiving an external clock signal, and a processing unit connected to the external clock input and to the loop filter output and configured to generate a control signal from the external clock signal and from the output signal of the loop filter, the control signal being intended to control the digitally controlled oscillator.

According to another aspect, a host apparatus is proposed, comprising a device as defined above.

This host apparatus may be, particularly but not exclusively, a transponder, or a contactless smart card, or a communication apparatus, for example a tablet or a cellular mobile telephone, emulated in card mode.

BRIEF DESCRIPTION OF THE DRAWINGS

Other advantages and characteristics of the invention will be apparent from a perusal of the detailed description and of the appended drawings, which are not limiting in any way, in which.

DETAILED DESCRIPTION OF ILLUSTRATIVE EMBODIMENTS

Figure 1:
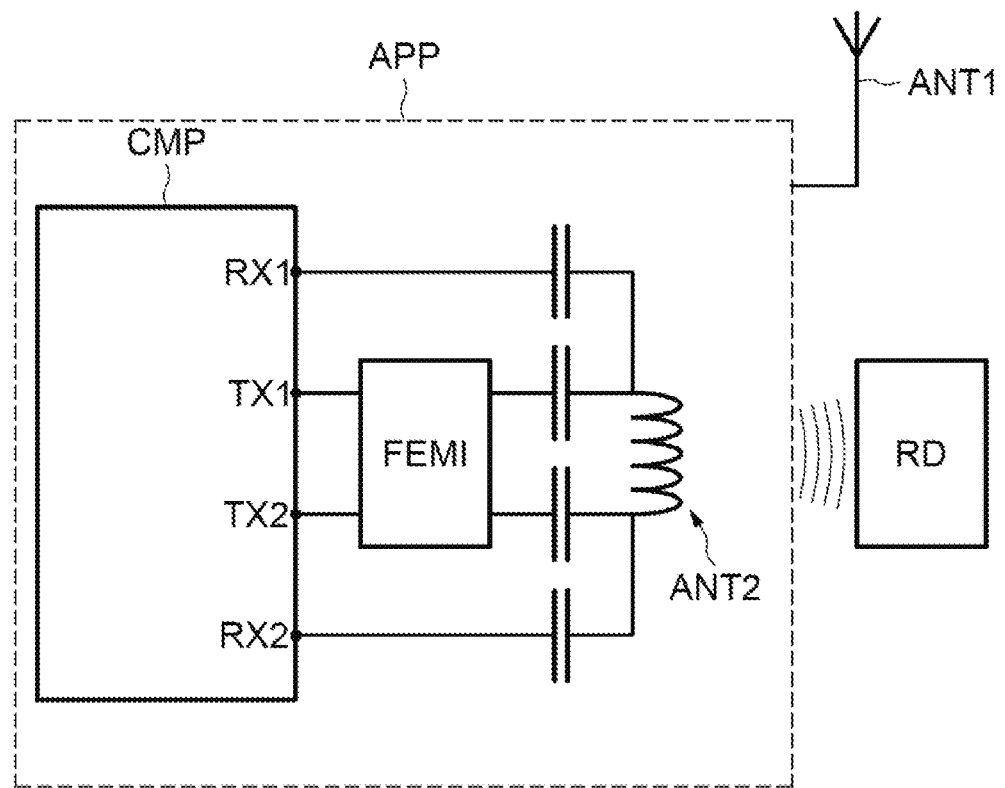
FIGS. 1 to 5 show embodiments and applications of the invention.

In FIG. 1, the reference APP denotes a communication apparatus, for example, a cellular mobile telephone equipped with an antenna ANT1 for establishing telephonic communication.

In the present case, the apparatus APP also comprises a contactless communication device CMP, of the NFC type for example. This device may be, for example, a contactless electronic chip of the NFC type.

In this case it is assumed that the host apparatus APP is emulated in card mode. In a conventional manner, the device CMP has two contacts TX1 and TX2 and two other contacts RX1 and RX2.

An antenna ANT2, for example, an inductive winding, may be used for the contactless communication with an external reader RD.

A first terminal of the antenna ANT2 is connected to the contacts TX1 and RX1, while the other terminal of the antenna ANT2 is connected to the contacts TX2 and RX2.

The contacts TX1 and TX2 form two output terminals of the device DIS for sending data to the antenna ANT2, while the contacts RX1 and RX2 form two input terminals of the device for receiving data from the antenna ANT2.

In a conventional manner, an external impedance matching circuit is connected between the antenna ANT2 and the device CMP, and a filter FEMI for filtering electromagnetic interference is connected, in a known and conventional way, between the contacts TX1, TX2 and the antenna ANT2.

Figure 4:
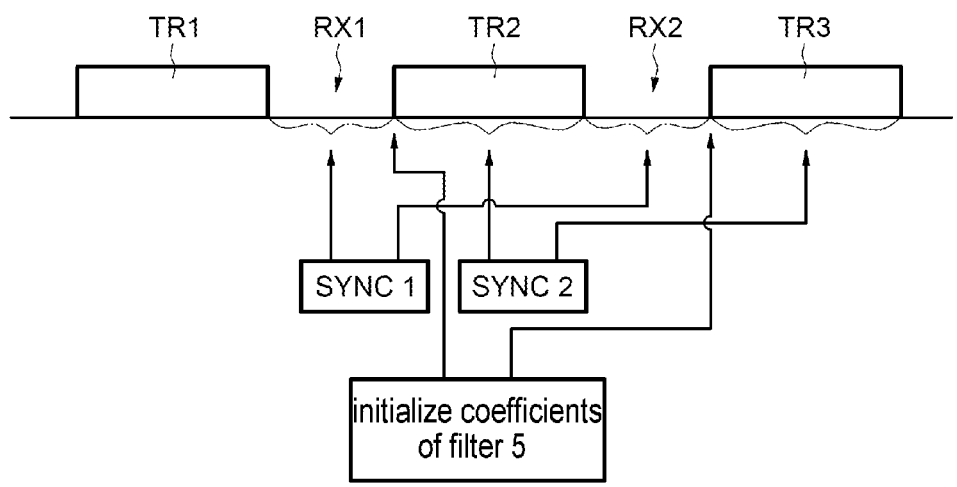

The contactless communication device CMP is capable of communicating in a contactless way with the reader RD by using active load modulation and, as shown in FIG. 4, of transmitting frames TR1, TR2, TR3, . . . to the reader RD.

Each frame is preceded by a reception period RX1, RX2, . . . .

During these reception periods, only the reader RD generates its electromagnetic field and the module for transmitting information to the device, which is then in the listening phase.

Figure 2:
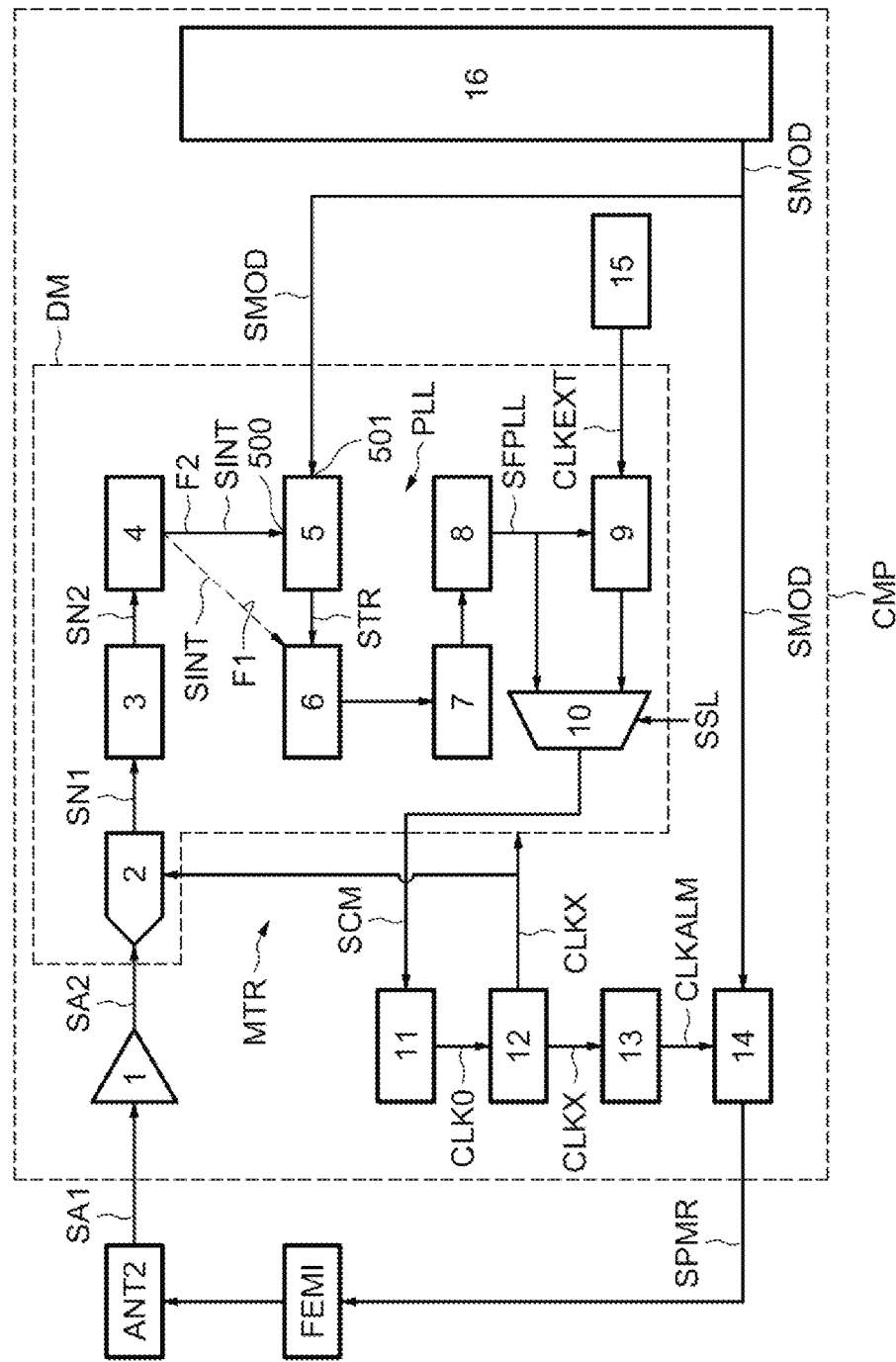

Thus, during each reception period, the antenna receives a reader signal SA1 (FIG. 2).

During each frame TRi, the antenna is designed to receive a reader carrier signal SA1 and to transmit a modulated device carrier signal SPMR to the reader (FIG. 2).

Additionally, as shown in FIG. 2, the device CMP comprises processor MTR configured to carry out synchronization between a device carrier clock signal CLKALM, generated within the device CMP, and the reader carrier signal received on the antenna ANT2.

More precisely, the processor MTR is configured for carrying out, in each reception period RXi, a first synchronization SYNC1 (FIG. 4) between a signal SA2 originating from the reader signal SA1 received on the antenna ANT2 and a device carrier clock signal device CLKALM generated in the device, and carrying out, within each frame TRi, a modulated device carrier signal suppression process SPMR, this suppression process being carried out on an intermediate signal SINT originating from that delivered by the antenna ANT2, in order to obtain a processed signal STR, and a second synchronization SYNC2 (FIG. 4) between the processed signal STR and the device carrier clock signal CLKALM.

The intermediate signal SINT is a digital signal, and the processor MTR then comprises a processing module 5 configured to carry out the suppression process in a digital manner.

More precisely, the device DIS comprises a domain DM timed by an auxiliary clock signal CLKX which has originated, as detailed below, from the output signal CLKO of a digitally controlled oscillator 11.

By way of example, the auxiliary clock signal CLKX has a frequency of 54.24 MHz, while the signal CLKO delivered by the oscillator 11 has a frequency of 868 MHz.

It will be recalled here that the carrier signal generated by the reader has a frequency of 13.56 MHz, and that the device carrier clock signal CLKLM also has a frequency of 13.56 MHz.

The processor MTR comprises a phase lock loop PLL, one input of which is defined by the input of an analog to digital converter 2 timed at the rate of the auxiliary clock signal CLKX.

This analog to digital converter receives an analog signal SA2 obtained from the signal SA1 delivered by the antenna, after amplification in an amplifier 1 for example.

It should be noted here that the signal SA1 is a combination of the reader carrier signal generated by the reader and the modulated device carrier signal SPMR transmitted via the antenna to the reader during the transmission frames.

The analog to digital converter 2 delivers a digital signal SN1 that undergoes transposition to baseband in a stage 3 of conventional known structure, for example a 13.56 MHz derotator.

The signal SN2 is therefore a digital baseband signal.

This signal SN2 undergoes decimation (subsampling) in a decimator unit 4, for example so as to retain only one sample in every 16.

The intermediate signal SINT is then obtained at the output of the decimator unit 4, and the module 5 will carry out the suppression process, which is a noise suppression algorithm in this case, on the intermediate signal.

In this example, the noise is formed by the modulation signal SMOD which is received on an auxiliary input 501 of the module 5 when the signal SINT is received on the main input 500.

In practice, the modulated device carrier signal SPMR to be transmitted to the reader via the antenna after passing through the filter FEMI is a signal modulated by the modulation signal SMOD, which comprises modulation symbols +1−1 delivered at the rate of a frequency of a subcarrier (847.5 kHz in the present case).

In practice, whenever the modulation symbol is equal to 1, the phase of the signal CLKALM is unchanged, whereas the phase is inverted when the modulation symbol is equal to −1.

The modulation signal SMOD is delivered in a conventional manner by a processor 16 which also processes the received symbols originating from the carrier signal of the reader.

Figure 3:
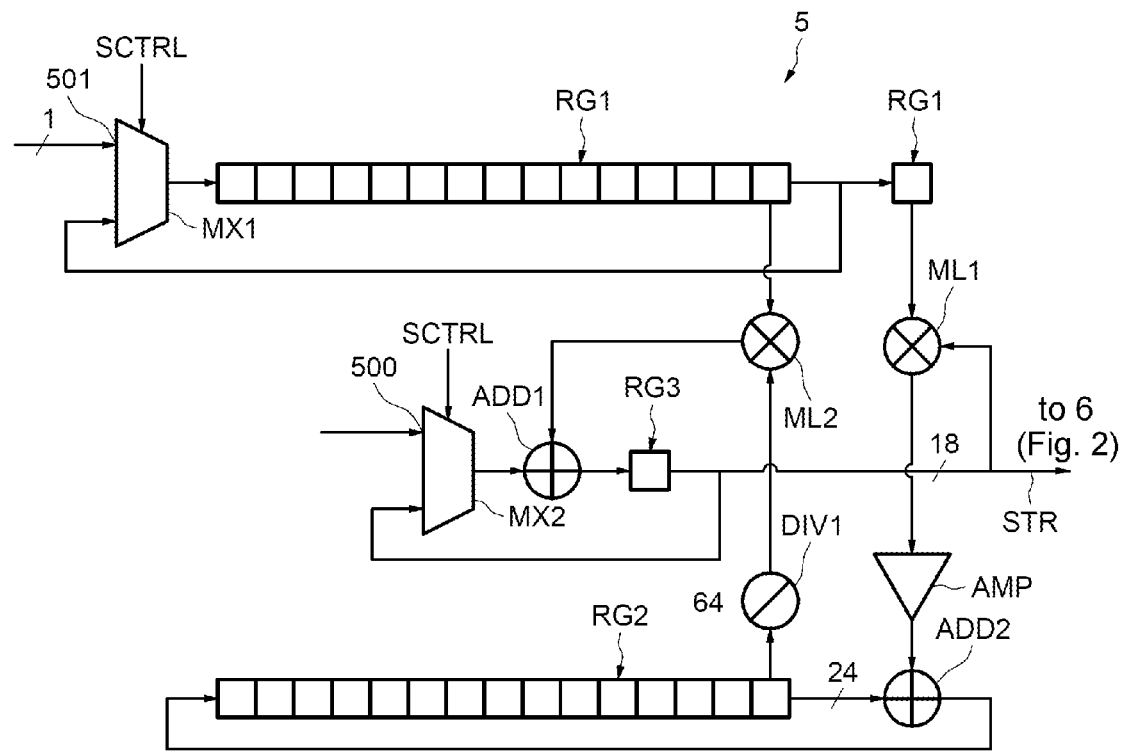

Reference will now be made more particularly to FIG. 3 for the purpose of describing a possible architecture of the processing module 5.

This architecture implements adaptive filtering, using the recursive least squares method to estimate the filter coefficients.

The filter described here is a filter of the finite impulse response type.

The auxiliary input 501, which receives the symbols of the modulation signal SMOD in baseband (symbols composed of +1 and −1) is connected, via a multiplexer MX1 controlled by a control signal SCTRL, to a first shift register RG1, in this case a 16-bit register, for storing the successive symbols.

Each modulation symbol is delivered to the first register RG1 at the rate of the subcarrier frequency.

The filter 5 also comprises a second shift register RG2, also of the 16-bit type, for storing the filter coefficients, which are updated in the course of their estimation by the least squares method.

The output of the register RG2 is looped back to the input of the same register RG2 via an adder ADD2 which also receives the output of an amplifier AMP for amplifying the gain of the least squares error. The input of the amplifier is connected to the sixteenth flip-flop of the register RG1 via a multiplier ML1 which also receives the least squares error, this error corresponding to the output of the filter.

The output of the register RG2 is also connected to a first input of a multiplier ML2, which also receives the output of the fifteenth flip-flop of the register RG1.

The output of the multiplier is connected to a first input of an adder ADD1, which also receives the output of a multiplexer MX2, a first input of which forms the main input 500 of the filter (the input that receives the samples of the intermediate signal SINT).

The output of the adder ADD1 is connected to a third register RG3 (18-bit register) which is connected, on the one hand, to the output of the filter and therefore delivers the signal STR, and which, on the other hand, is looped back to the second input of the multiplexer MX2.

The output of the filter therefore delivers the processed signal STR which, after the convergence of the filter, is stripped, as far as possible, of the signal SPMR that is transmitted to the reader and that is found in the reception chain at the position of the antenna ANT2.

Since the auxiliary signal CLKX, which originates from the output signal CLKO of the oscillator 11, times the analog to digital converter 2, and since the carrier clock signal CLKALM is itself generated from this signal CLKO, the phase lock loop PLL will be intended to lock the value of the reader carrier signal phase to a constant value.

The phase lock loop PLL also comprises, at the output of the suppression module 5, a low-pass filter 6 followed by a phase estimation module, for example a module of the CORDIC type which is well known to those skilled in the art.

This estimation module 7 delivers a constant phase value from its output to a loop filter 8 having a conventional and known structure.

The output of the loop filter 8 is connected to a first input of a multiplexer 10 whose output delivers a control signal SCM designed to control the oscillator 11.

The multiplexer 10 is controlled by a selection signal SSL.

When the output of the loop filter 8 is effectively linked to the output of the multiplexer 10, the control signal SCM is the output signal of the loop filter.

Therefore it is also possible to provide an external clock 15 which delivers an external clock signal CLKEXT.

In fact, depending on the characteristics of the oscillator 11, the bandwidth specifications of the phase lock loop may impose constraints. By using an external clock signal it is possible to reconcile these high requirements in terms of bandwidth with a desire to preferably limit the amount of noise in the estimation carried out by the phase lock loop.

In fact, in this case, the high-frequency noise of the oscillator is compensated by the phase lock loop using the external clock signal CLKEXT, while the low-frequency noise of the oscillator is compensated by the phase lock loop using the phase of the signal SINT.

A unit 9 also receives the output signal SFPLL of the loop filter 8 and the external clock signal CLKEXT, and combines these two signals to form the control signal SCM of the oscillator.

More precisely, the unit 9 generates the control signal configured to control the oscillator 11 so that it generates the signal CLKO having a frequency of $\alpha \cdot fCLKEXT$, where $\alpha$ is a non-integer number and fCLKEXT is the frequency of the external clock signal CLKEXT. In the example of implementation described here, the nominal value of $\alpha$ is (64*13.56 MHz)/fCLKEXT.

The signal SFPLL is used to shift the operating point of the phase lock loop and continuously adjust the value of $\alpha$ in order to lock the phase of the signal SINT.

The adjustments of $\alpha$ take place at a rate far below that required for the direct control of the oscillator 11 by the output signal of the loop filter SFPLL. The acceptable noise on the signal SINT during this control of the oscillator 11 using the combination of the external clock and the signal SFPLL is then much higher (being increased by about 20 to 30 dB) than in the case of direct control of the oscillator 11 by the signal SFPLL. The tolerated attenuation on the reader signal benefits directly from this gain. In other words, this attenuation may be more significant than in the case of direct control of the oscillator 11 by the signal SFPLL.

As indicated above, the auxiliary clock signal CLKX is obtained from the output signal CLKO of the oscillator 11 after passing through a first divider 12.

The signal CLKX is then delivered to a second divider 13 so as to obtain the device carrier clock signal CLKALM having a frequency of 13.56 MHz, phase synchronized with the reader carrier signal.

A unit 14, having a known conventional structure, then receives the modulation signal SMOD and the signal CLKALM, and, after the signal CLKALM has or has not been inverted according to the value of the received modulation symbol, delivers the modulated device carrier signal SPMR to be transmitted to the reader via the filter FEMI and the antenna ANT2.

As shown in FIG. 4, in order to accelerate the convergence of the suppression filter 5, it is preferable to initialize the coefficients of the filter 5 before the start of each transmission frame TRi. This initialization may be carried out by a controller incorporated into the processor 16.

Additionally, in order to carry out the first synchronization SYNC1, the same phase lock loop PLL as that described with reference to FIG. 2 may advantageously be used, but with the suppression module 5 disabled, because, in this case, there is no data transmission and therefore no electromagnetic field generation by the device during each reception period RXi.

This is illustrated by the arrow F1 shown in broken lines in FIG. 2. The arrow F2 relates to the synchronization SYNC2.

For the purposes of the invention, disabling the filtering module may be taken to mean simply a short circuit of the module 5 or an initialization of this module (by resetting the adaptive filter coefficients to zero). This disabling may also be carried out by the controller incorporated into the processor 16.

In some cases, the noise suppression algorithm described above may be insufficient. This is the case, in particular, when the phase lock loop signal is very noisy, for example when a type A protocol is used at 106 kbits per second.

Figure 5:
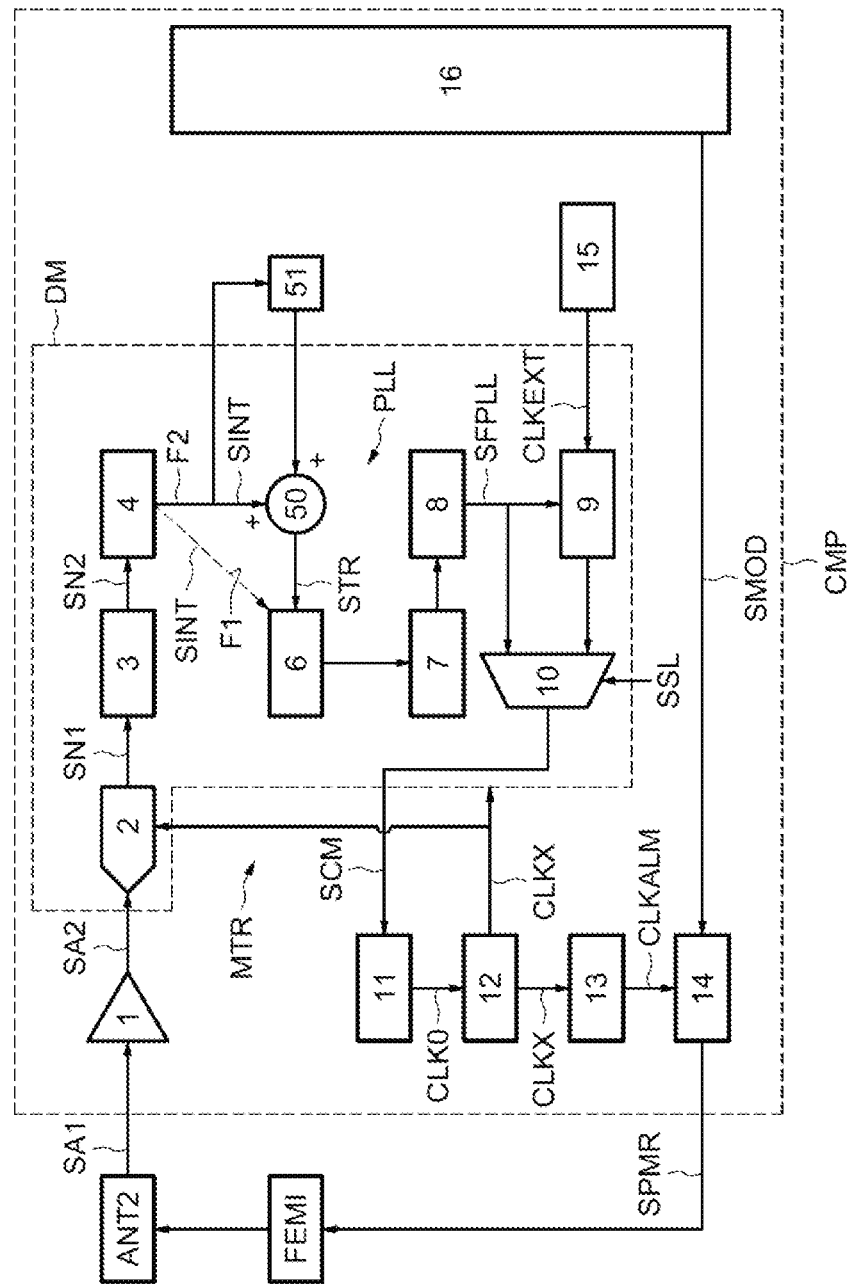

In this case, it is preferable to use an algorithm for autosuppression of the transmitted signal, an implementation of which is shown in FIG. 5.

In this figure, all elements similar, or having functions similar, to those described with reference to FIG. 2 have the same references. Only the differences between these two figures will be described now.

In this embodiment, the suppression module 5 of FIG. 2 is replaced by a summer 50 which summates the intermediate signal SINT with the intermediate signal SINT delayed by a delay 51 equal to a fraction of the period of the modulation signal SMOD.

Thus, for example, when a signal resulting from a type A or B protocol using an 848 kHz subcarrier is used, the modulation signal comprises a number of sequences of the type −1−1, 1,1, −1−1, 1,1, −1−1, 1,1, −1−1 (at 4*848 kHz).

The summation of this sequence with itself, delayed by a half-period of the subcarrier, results in the suppression of this sequence. However, this autosuppression is possible only during periods in which the subcarrier phase does not change.

Thus, when the signal SINT is summated with itself, delayed by a half-period of the subcarrier, after a convergence time that may be determined during the calibration of the system, there is a suppression of the signal SPMR transmitted to the reader at the output of the adder 50.

If, for example, a speed of 848 kbits per second is used, a bit then contains only one subcarrier period. When the transmitted bits are repeated, a number of subcarrier periods having the same phase follow one another. The signal SINT may then be added to itself, delayed by a half-period of the subcarrier.

When the transmitted bits are a succession of {0,1}, the signal no longer has a period equal to that of the subcarrier, but has a double period. The autosuppression of the modulated signal in the signal SINT is then obtained by shifting the intermediate signal SINT by a whole subcarrier period before adding it to itself.

The symbols of the modulation signal SMOD may be used to identify the parts of the transmission signal suitable for autosuppression, and to determine whether the signal SINT should be shifted by a half-period or a whole period of the subcarrier.

This method may be applied to a type F signal, defined in the JIS X6319-4 standard, this signal being one which may be considered to be a modulation of a subcarrier whose period is equal to the symbol period.

What is claimed is:

1. A method of contactless communication from a device to a reader the method comprising:
   receiving a reader signal at an antenna of the device during one or more reception periods and in each reception period performing a first synchronization between a signal originating from the reader signal received at the antenna and a device carrier clock signal generated in the device;
   receiving a reader carrier signal at the antenna of the device during transmission frames and transmitting a modulated device carrier signal to the reader during transmission frames, each transmission frame being preceded by one of the reception periods;
   performing a suppression process during each transmission frame on an intermediate signal originating from the reader carrier signal received at the antenna, wherein the intermediate signal comprises a component of the modulated device carrier signal, wherein the component of the modulated device carrier signal in the intermediate signal is suppressed to obtain a processed signal; and during each transmission frame performing a second synchronization between the processed signal and the device carrier clock signal, wherein the method of contactless communication comprises using active load modulation.

2. The method according to claim 1, wherein the intermediate signal is a digital signal and the suppression process is a digital process.

3. The method according to claim 2, wherein the suppression process uses an auxiliary signal containing modulation symbols of the modulated device carrier signal.

4. The method according to claim 3, wherein the suppression process comprises an adaptive filtering process comprising an estimation of filter coefficients by a least squares method.

5. The method according to claim 4, wherein the filter coefficients are initialized before each transmission frame begins.

6. The method according to claim 2, wherein the modulated device carrier signal is modulated by a periodic modulation signal, and the suppression process comprises a summation of at least a part of the intermediate signal with the part of the intermediate signal delayed by a delay which is equal, according to a sequence of symbols transmitted, to a half period or a whole period of the periodic modulation signal.

7. The method according to claim 2, wherein the intermediate signal originates from an analog to digital conversion of an analog signal originating from the reader carrier signal received at the antenna, and the device carrier clock signal is generated from an output signal of a digitally controlled oscillator belonging to a phase lock loop receiving the analog signal and incorporating a suppression circuit implementing the suppression process, the analog to digital conversion being carried out at a rate of an auxiliary clock signal originating from the output signal of the digitally controlled oscillator.

8. The method according to claim 7, wherein the first synchronization is performed using the phase lock loop with the suppression process disabled.

9. The method according to claim 7, wherein the digitally controlled oscillator is controlled by a control signal obtained solely from an output signal of a loop filter of the phase lock loop.

10. The method according to claim 7, wherein the digitally controlled oscillator is controlled by a control signal obtained from an external clock signal and from an output signal of a loop filter of the phase lock loop.

11. A contactless communication device comprising:

an antenna configured to receive a reader signal produced by a reader during one or more reception periods, configured to receive a reader carrier signal produced by the reader during one or more transmission frames each transmission frame being preceded by one of the reception periods, and configured to transmit a modulated device carrier signal to the reader during each transmission frame; and wherein the contactless communication device is configured to use active load modulation to communicate with the reader in a contactless way, perform a first synchronization during each reception period between a signal originating from the reader signal received at the antenna and a device carrier clock signal generated in the contactless communication device perform a suppression process on an intermediate signal originating from the reader carrier signal received at the antenna to obtain a processed signal by suppressing a component of the modulated device carrier signal in the intermediate signal, and perform a second synchronization between the processed signal and the device carrier clock signal.

12. The contactless communication device according to claim 11, wherein the intermediate signal is a digital signal, and the contactless communication device further comprises a suppression circuit configured to carry out the suppression process in a digital manner.

13. The contactless communication device according to claim 12, wherein the suppression circuit comprises an input for receiving an auxiliary signal containing modulation symbols of the modulated device carrier signal.

14. The contactless communication device according to claim 13, wherein the suppression circuit comprises an adaptive filter configured to estimate filter coefficients according to a least squares method.

15. The contactless communication device according to claim 14, further comprising a controller configured to initialize the filter coefficients of the adaptive filter before the start of each frame.

16. The contactless communication device according to claim 12, wherein the modulated device carrier signal is modulated by a periodic modulation signal, and the suppression circuit comprises a summer configured to carry out a summation of at least a part of the intermediate signal with the part of the intermediate signal delayed by a delay having a value equal, according to a sequence of transmitted symbols, to a half period or a whole period of the periodic modulation signal.

17. The contactless communication device according to claim 12 further comprising:

a phase lock loop comprising an analog to digital converter having an input coupled to the antenna and capable of delivering the intermediate signal, the phase lock loop also comprising the suppression circuit and a digitally controlled oscillator having an output capable of delivering an oscillator signal;

a first clock signal generator configured to receive the oscillator signal and to generate an auxiliary clock signal for timing the analog to digital converter; and a second clock signal generator configured to generate the device carrier clock signal from the oscillator signal.

18. The contactless communication device according to claim 17 further comprising a first synchronization circuit configured to carry out the first synchronization, the first synchronization circuit comprising the phase lock loop and a controller configured to disable the suppression circuit.

19. The contactless communication device according to claim 17, wherein the phase lock loop comprises a loop filter configured to deliver a filter output signal for controlling the digitally controlled oscillator.

20. The contactless communication device according to claim 17, wherein the phase lock loop comprises a loop filter and a control-signal-generation circuit comprising an external clock input configured to receive an external clock signal and coupled to an output of the loop filter wherein the control-signal-generation circuit is configured to generate a control signal from the external clock signal and from an output signal of the loop filter, wherein the control signal controls the digitally controlled oscillator.

21. The contactless communication device according to claim 12, wherein the contactless communication device is a transponder, a contactless smart card, or a communication apparatus.

22. The contactless communication device according to claim 12, wherein the contactless communication device is a tablet or a cellular mobile telephone emulated in card mode.

23. A method of contactless communication from a device to a reader, the method comprising:
- receiving a reader signal at an antenna of the device during one or more reception periods and in each reception period performing a first synchronization between a signal originating from the reader signal received at the antenna and a device carrier clock signal generated in the device;
- receiving a reader carrier signal at the antenna of the device during transmission frames and transmitting a modulated device carrier signal to the reader during transmission frames, each transmission frame being preceded by one of the reception periods;
- performing a suppression process using an auxiliary signal containing modulation symbols of the modulated device carrier signal during each transmission frame on an intermediate signal originating from the reader carrier signal received at the antenna, wherein the intermediate signal comprises a component of the modulated device carrier signal, wherein the component of the modulated device carrier signal in the intermediate signal is suppressed to obtain a processed signal; and
- during each transmission frame performing a second synchronization between the processed signal and the device carrier clock signal, wherein the method of contactless communication comprises using active load modulation.

24. The method according to claim 23, wherein the suppression process comprises an adaptive filtering process comprising an estimation of filter coefficients by a least squares method.

25. The method according to claim 24, wherein the filter coefficients are initialized before each transmission frame begins.

* * * * *